(12) United States Patent
Morio et al.

(10) Patent No.: US 11,512,767 B2
(45) Date of Patent: Nov. 29, 2022

(54) RESIN GEAR AND RESIN GEAR MANUFACTURING METHOD

(71) Applicant: Showa Denko Materials Co., Ltd., Tokyo (JP)

(72) Inventors: Yoichi Morio, Tokyo (JP); Tatsuya Aoyagi, Tokyo (JP)

(*) Notice: Subject to any disclaimer, the term of this patent is extended or adjusted under 35 U.S.C. 154(b) by 120 days.

(21) Appl. No.: 16/972,608

(22) PCT Filed: Jun. 21, 2018

(86) PCT No.: PCT/JP2018/023688
§ 371 (c)(1),
(2) Date: Dec. 7, 2020

(87) PCT Pub. No.: WO2019/244310
PCT Pub. Date: Dec. 26, 2019

(65) Prior Publication Data
US 2021/0231204 A1    Jul. 29, 2021

(51) Int. Cl.
*F16H 55/06* (2006.01)
*F16H 55/17* (2006.01)

(52) U.S. Cl.
CPC .............. *F16H 55/06* (2013.01); *F16H 55/17* (2013.01); *F16H 2055/065* (2013.01)

(58) Field of Classification Search
CPC ..... F16H 55/06; F16H 55/17; F16H 2055/065
See application file for complete search history.

(56) References Cited

U.S. PATENT DOCUMENTS

| | | | |
|---|---|---|---|
| 2,955,481 A * | 10/1960 | Jackel | F16H 55/14 74/438 |
| 3,901,162 A * | 8/1975 | Bertin | B61B 13/02 104/287 |
| 2021/0231205 A1* | 7/2021 | Morio | F16H 55/17 |
| 2021/0231206 A1* | 7/2021 | Morio | F16H 55/17 |

FOREIGN PATENT DOCUMENTS

| | | | | |
|---|---|---|---|---|
| CN | 112728036 A | * | 4/2021 | ............. F16H 55/14 |
| CN | 113236734 A | * | 8/2021 | ............. F16H 55/14 |
| JP | S63-126656 | | 8/1988 | |
| JP | 2007-270878 | | 10/2007 | |
| JP | 2017-015100 | | 1/2017 | |
| JP | 2017-089778 | | 5/2017 | |

OTHER PUBLICATIONS

International Preliminary Report on Patentability with Written Opinion dated Dec. 30, 2020 for PCT/JP2018/023688.
International Search Report dated Sep. 25, 2018 for PCT/JP2018/023688.

* cited by examiner

*Primary Examiner* — Terence Boes
(74) *Attorney, Agent, or Firm* — Soei Patent & Law Firm (57) ABSTRACT

A resin gear includes an annular metal bush and an annular resin member provided around the metal bush. The metal bush and the resin member are disposed so as to be relatively rotatable in a direction of rotation of the resin gear. A plurality of spaces entering an outer peripheral surface of the metal bush and an inner peripheral surface of the resin member are formed, so as to be aligned along the direction of rotation, between the metal bush and the resin member. The space has, in at least one end portion in an axial direction of the resin gear, inner surfaces intersecting with the axial direction. An elastic member is disposed in the space. The elastic member engages with the inner surfaces.

12 Claims, 6 Drawing Sheets

RESIN GEAR AND RESIN GEAR MANUFACTURING METHOD

CROSS-REFERENCE TO RELATED APPLICATIONS

This application is a 35 U S C § 371 national phase application of PCT/JP2018/023688, filed on Jun. 21, 2018.

TECHNICAL FIELD

One aspect of the present invention relates to a resin gear and a resin gear manufacturing method.

BACKGROUND ART

Resin gears are lightweight, excellent in quietness, and widely used as, for example, vehicular or industrial gears. A resin gear including a metal bush, a resin member provided around the metal bush and having a tooth profile formed in an outer peripheral portion, and an elastic member provided between the metal bush and the resin member is known as a resin gear (see, for example, Patent Literature 1). In a case where an impact is applied to such a resin gear as a result of meshing with another gear, the impact is absorbed and damped by elastic deformation of the elastic member, that is, the damper effect (damping function) of the elastic member is obtained.

CITATION LIST

Patent Literature

Patent Literature 1: Japanese Unexamined Patent Publication No. 2017-015100

SUMMARY OF INVENTION

Technical Problem

In the resin gear described above, the elastic member is bonded by means of an adhesive to the outer peripheral surface of the metal bush and the inner peripheral surface of the resin member. In this case, the damper effect of the elastic member may not be sufficiently obtained depending on, for example, the degree of adhesion of the adhesive.

An object of one aspect of the present invention is to provide a resin gear and a resin gear manufacturing method allowing the damper effect of an elastic member to be sufficiently obtained.

Solution to Problem

A resin gear according to one aspect of the present invention is a resin gear including an annular metal bush and an annular resin member provided around the metal bush and having a tooth profile formed in an outer peripheral portion, in which the metal bush and the resin member are disposed so as to be relatively rotatable in a direction of rotation of the resin gear, a plurality of spaces entering an outer peripheral surface of the metal bush and an inner peripheral surface of the resin member are formed, so as to be aligned along the direction of rotation, between the metal bush and the resin member, the space has, in at least one end portion in an axial direction of the resin gear, an inner surface intersecting with the axial direction, an elastic member is disposed in the space, and the elastic member engages with the inner surface.

In a case where an impact is applied to the resin gear according to one aspect of the present invention as a result of meshing with another gear, the resin member tends to rotate relative to the metal bush in the direction of rotation of the resin gear (hereinafter, also simply referred to as "relative rotation"). At this time, a pair of forces (shearing forces) in opposite directions are generated on the resin member side and the metal bush side of the elastic member disposed in the space, the elastic member is elastically deformed, and the elastic member acts as a detent against the relative rotation. As a result, in a case where an impact is applied as a result of meshing with another gear, the impact is sufficiently absorbed and damped by such elastic deformation. Accordingly, the damper effect of the elastic member can be sufficiently obtained.

In this resin gear, the elastic member engages with the inner surface. As a result, disengagement of the elastic member from the space in the axial direction of the resin gear (hereinafter, simply referred to as "axial direction") can be prevented. As a result, in the resin gear, the damper effect of the elastic member can be more reliably obtained.

In the resin gear according to one aspect of the present invention, the space may have the inner surface in one end portion in the axial direction and an opening portion in the other end portion of the space in the axial direction may be smaller in inner diameter than the one end portion side of the space. As a result, axial disengagement of the elastic member from the space can be more reliably prevented.

In the resin gear according to one aspect of the present invention, the elastic member may be press-fitted into the space. As a result, the resin gear can be assembled by the work of inserting the elastic member with respect to the metal bush and the resin member. Accordingly, the resin gear can be manufactured more easily than in a case where the elastic member is formed by injection molding or the like.

In the resin gear according to one aspect of the present invention, the metal bush and the resin member may abut against each other so as to be slidable in the direction of rotation. As a result, it is possible to realize a configuration in which the metal bush and the resin member are disposed so as to be rotatable relative to each other.

In the resin gear according to one aspect of the present invention, the metal bush and the resin member may not be bonded to each other. As a result, it is possible to realize a configuration in which the metal bush and the resin member are disposed so as to be rotatable relative to each other.

In the resin gear according to one aspect of the present invention, the elastic member may be bonded to an inner surface of the space. In this case, the elastic member is unlikely to disengage from the space, the elastic member can be elastically deformed to a large extent, and thus it is also possible to cope with a case where a large impact is applied. Eventually, it is possible to realize the resin gear that is capable of coping with a high load.

A resin gear manufacturing method according to one aspect of the present invention is a method for manufacturing a resin gear including an annular metal bush, an annular resin member provided around the metal bush and having a tooth profile formed in an outer peripheral portion, and an elastic member provided between the metal bush and the resin member, in which the metal bush and the resin member are disposed so as to be relatively rotatable in a direction of rotation of the resin gear, a plurality of spaces entering an outer peripheral surface of the metal bush and an inner peripheral surface of the resin member are formed, so as to be aligned along the direction of rotation, between the metal bush and the resin member, the space has, in at least one end portion in an axial direction of the resin gear, an inner surface intersecting with the axial direction, and the elastic member and the inner surface are engaged with each other by the elastic member being press-fitted into the space.

In the resin gear manufacturing method according to one aspect of the present invention, the elastic member is press-fitted into the space. In the resin gear in which the elastic member is disposed in the space as described above, the resin member tends to rotate relative to the metal bush in a case where an impact is applied as a result of meshing with another gear. At this time, a pair of forces (shearing forces) in opposite directions are generated on the resin member side and the metal bush side of the elastic member disposed in the space, the elastic member is elastically deformed, and the elastic member acts as a detent against the relative rotation. As a result, in a case where an impact is applied as a result of meshing with another gear, the impact is sufficiently absorbed and damped by such elastic deformation. Accordingly, the damper effect of the elastic member can be sufficiently obtained.

In this resin gear manufacturing method, the elastic member and the inner surface are engaged with each other by the elastic member being press-fitted into the space. As a result, the resin gear can be assembled by the work of inserting the elastic member with respect to the metal bush and the resin member. Accordingly, the resin gear can be easily manufactured.

Advantageous Effects of Invention

According to one aspect of the present invention, it is possible to provide a resin gear that is capable of sufficiently obtaining the damper effect of an elastic member.

DESCRIPTION OF EMBODIMENTS

Hereinafter, an embodiment will be described in detail with reference to the accompanying drawings. In the description of the drawings, the same or corresponding elements will be denoted by the same reference symbols without redundant description.

Figure 1:
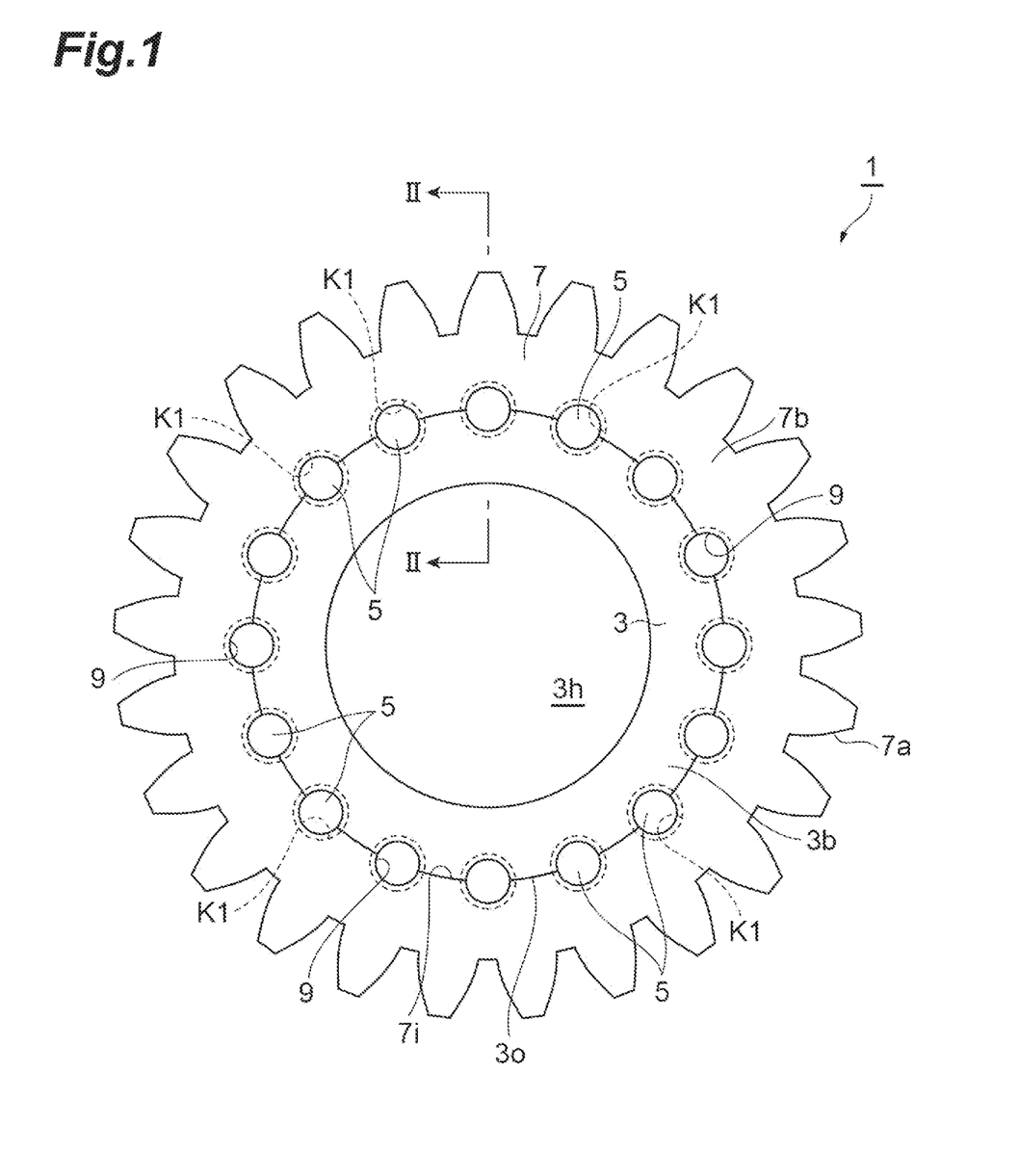
FIG. 1 is a front view of a resin gear according to one embodiment.
Figure 2:
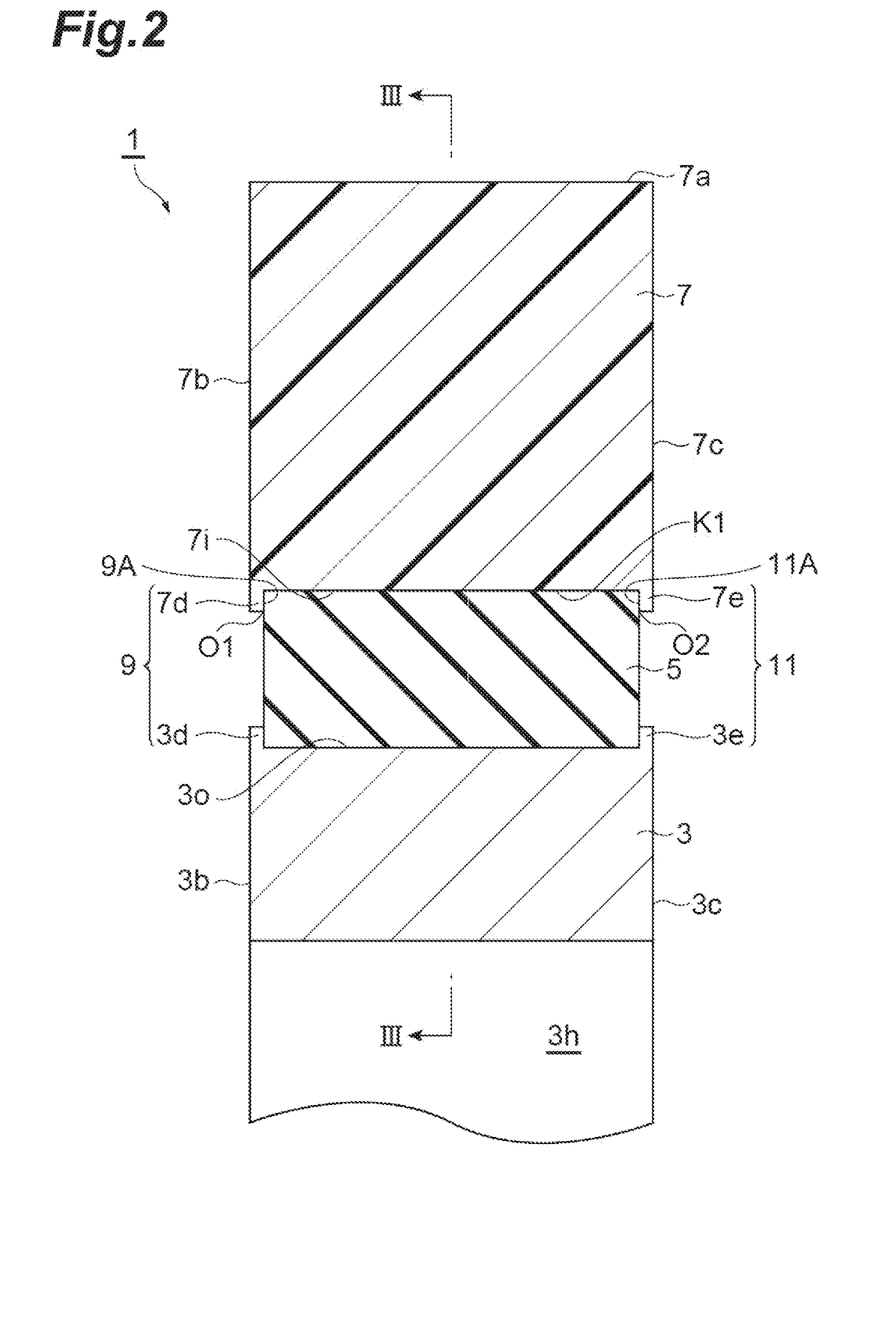
FIG. 2 is a cross-sectional view taken along line II-II of FIG. 1.

As illustrated in FIGS. 1 and 2, a resin gear 1 is a so-called high-strength resin gear and is used as a vehicular or industrial gear. For example, the resin gear 1 can be used as a balance shaft gear, a camshaft gear, or the like in an engine. The resin gear 1 includes a metal bush 3 and a resin member 7. The resin gear 1 is a spur gear.

The metal bush 3 is a member attached to, for example, a rotary shaft (not illustrated). The metal bush 3 has a circular ring shape. The metal bush 3 is formed of a metal such as stainless steel. The metal bush 3 is provided with a through hole $3h$ into which the rotary shaft is inserted.

The resin member 7 is a member meshing with another gear. The resin member 7 has an annular shape. The resin member 7 is formed of resin. The resin member 7 is provided around the metal bush 3. A tooth profile $7a$ is formed in the outer peripheral portion of the resin member 7. A plurality of the tooth profiles $7a$ are formed at predetermined intervals in the circumferential direction of the resin member 7. It should be noted that provision around an elastic member 5 includes not only being provided in direct contact around the elastic member 5 but also being provided via another member around the elastic member 5.

The metal bush 3 and the resin member 7 are disposed so as to be relatively rotatable in the direction of rotation of the resin gear 1 (hereinafter, also simply referred to as "direction of rotation"). Specifically, the metal bush 3 and the resin member 7 abut against each other so as to be slidable in the direction of rotation. More specifically, the outer diameter of the metal bush 3 and the inner diameter of the resin member 7 are equal to each other, an outer peripheral surface $3o$ of the metal bush 3 and an inner peripheral surface $7i$ of the resin member 7 are not bonded to each other, and the outer peripheral surface $3o$ and the inner peripheral surface $7i$ are in contact with each other in a relatively rotatable state.

In the resin gear 1 of the present embodiment, a plurality of spaces K1 entering the outer peripheral surface $3o$ of the metal bush and the inner peripheral surface $7i$ of the resin member 7 are formed, so as to be aligned along the direction of rotation, between the metal bush 3 and the resin member 7. The space K1 is a hole penetrating the resin gear 1 along the axial direction of the resin gear 1 (hereinafter, also simply referred to as "axial direction"). When viewed from the axial direction, the spaces K1 are arranged at equal intervals along the direction of rotation.

The space K1 has a stepped columnar shape in which both end portions in the axial direction are smaller in diameter than the other part. The space K1 has an inner surface 9A and an inner surface 11A intersecting with the axial direction. The space K1 is defined by the U groove that is formed on the outer peripheral surface $3o$, the U groove that is formed on the inner peripheral surface $7i$ of the resin member 7, a first locking portion 9, and a second locking portion 11. In the radial direction of the resin gear 1 (hereinafter, also simply referred to as "radial direction"), the inside half of the space K1 enters the metal bush 3 side and the outside half of the space K1 enters the resin member 7 side.

The first locking portion 9 is provided in one end portion in the axial direction. The first locking portion 9 forms a first opening portion O1 opening to one end surface $3b$ of the metal bush 3 and one end surface $7b$ of the resin member 7. The first opening portion O1 is smaller in inner diameter than the space K1.

The first locking portion 9 has a circular ring shape. The first locking portion 9 has the inner surface 9A. The first locking portion 9 is configured by the metal bush 3 and the resin member 7. Specifically, the first locking portion 9 is configured by a locking member $3d$ of the metal bush 3 and a locking member $7d$ of the resin member 7. The locking member $3d$ constitutes one half of the first locking portion 9 and has a half-divided shape in which the circular ring-shaped first locking portion 9 is divided in half. The locking member 3d protrudes to the center side of the space K1 beyond the inner surface of the U groove formed on the outer peripheral surface 3o. The inner surface of the locking member 3d constitutes the inner surface 9A. The outer surface of the locking member 3d is flush with the one end surface 3b of the metal bush 3.

The locking member 7d constitutes one half of the first locking portion 9 and has a half-divided shape in which the circular ring-shaped first locking portion 9 is divided in half. The locking member 7d protrudes to the center side of the space K1 beyond the inner surface of the U groove formed on the inner peripheral surface 7i. The inner surface of the locking member 7d constitutes the inner surface 11A together with the inner surface of the locking member 3d. The outer surface of the locking member 7d is flush with the one end surface 7b of the resin member 7.

The second locking portion 11 is provided in the other end portion in the axial direction. The second locking portion 11 forms a second opening portion O2 opening to the other end surface 3c of the metal bush 3 and the other end surface 7c of the resin member 7. The second opening portion O2 is smaller in inner diameter than the space K1.

The second locking portion 11 has a circular ring shape. The second locking portion 11 has the inner surface 11A. The second locking portion 11 is configured by the metal bush 3 and the resin member 7. Specifically, the second locking portion 11 is configured by a locking member 3e of the metal bush 3 and a locking member 7e of the resin member 7. The locking member 3e constitutes one half of the second locking portion 11 and has a half-divided shape in which the circular ring-shaped second locking portion 11 is divided in half. The locking member 3e protrudes to the center side of the space K1 beyond the inner surface of the U groove formed on the outer peripheral surface 3o. The inner surface of the locking member 3e constitutes the inner surface 11A. The outer surface of the locking member 3e is flush with the other end surface 3c of the metal bush 3.

The locking member 7e constitutes one half of the second locking portion 11 and has a half-divided shape in which the circular ring-shaped second locking portion 11 is divided in half. The locking member 7e protrudes to the center side of the space K1 beyond the inner surface of the U groove formed on the inner peripheral surface 7i. The inner surface of the locking member 7e constitutes the inner surface 11A together with the inner surface of the locking member 3e. The outer surface of the locking member 7e is flush with the other end surface 7c of the resin member 7.

The elastic member 5 is disposed in the space K1. The elastic member 5 has a columnar shape coaxial with and equal in diameter to the space K1 with the axial direction being the height direction of the elastic member 5. The outer peripheral surface of the elastic member 5 abuts against the inner surface of the space K1. At least a part of the elastic member 5 is bonded to the inner surface of the space K1. The elastic member 5 is provided so as to come into contact with the inner surface of the space K1 via an adhesive. Both height-direction end surfaces of the elastic member 5 abut against and are engaged with the inner surface 9A of the first locking portion 9 and the inner surface 11A of the second locking portion 11, respectively. As a result, axial movement of the elastic member 5 is restricted.

The elastic member 5 is formed of rubber. The rubber is butadiene rubber, chloroprene rubber, butyl rubber, styrene butadiene rubber, nitrile rubber, ethylene propylene rubber, acrylic rubber, fluororubber, epichlorohydrin rubber, silicone rubber, or the like. From the viewpoint of durability and heat resistance, the rubber is preferably fluororubber or silicone rubber. The elastic member 5 may be configured by a plurality of members (rubber layers) being stacked.

Figure 3A:
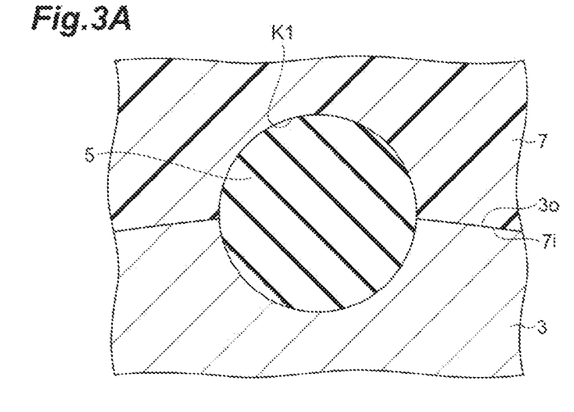
FIG. 3A is a cross-sectional view taken along line of FIG. 2 for describing elastic deformation of an elastic member of the resin gear.
Figure 3B:
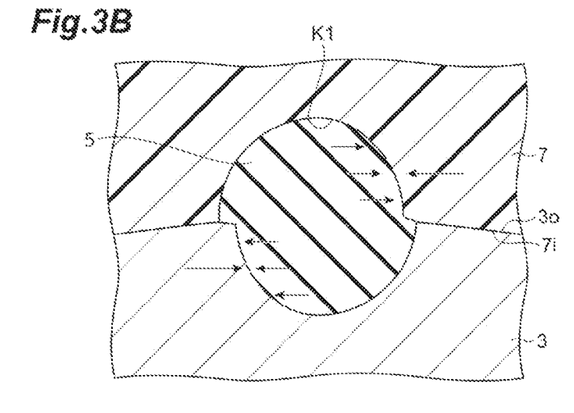
FIG. 3B is another cross-sectional view taken along line of FIG. 2 for describing the elastic deformation of the elastic member of the resin gear.

The elastic member 5 absorbs and damps the impact that is generated by the resin gear 1 meshing with another gear by being elastically deformed. Specifically, in a case where an impact is applied to the resin gear 1 as a result of meshing with another gear, the resin member 7 tends to rotate relative to the metal bush 3 in the direction of rotation. At this time, a pair of forces (shearing forces) in opposite directions are generated on the resin member 7 side and the metal bush 3 side in the elastic member 5 disposed in the space K1, the elastic member 5 is elastically deformed from the state that is illustrated in FIG. 3A to the state that is illustrated in FIG. 3B, and the elastic member 5 acts as a detent against the relative rotation. As a result, in a case where an impact is applied as a result of meshing with another gear, the impact is sufficiently absorbed and damped by such elastic deformation. Accordingly, the damper effect of the elastic member 5 can be sufficiently obtained.

Figure 4A:
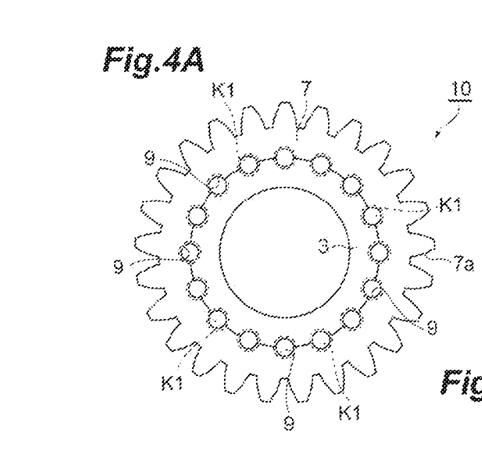
FIG. 4A is a diagram illustrating a resin gear manufacturing method.
Figure 4B:
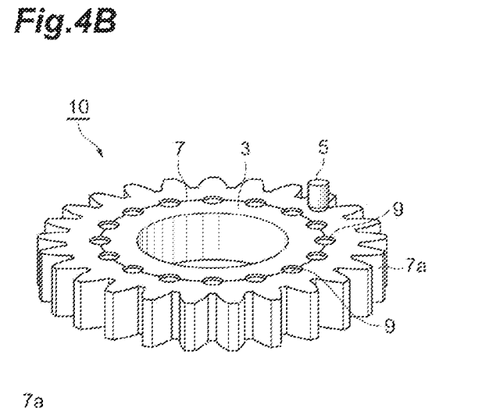
FIG. 4B is a diagram illustrating a continuation of FIG. 4A.
Figure 4C:
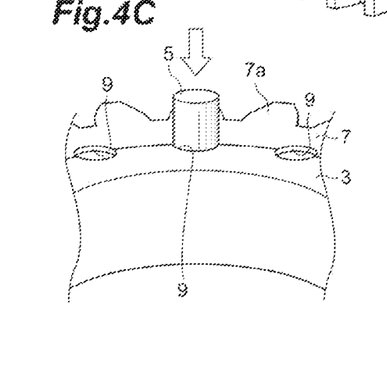
FIG. 4C is a diagram illustrating a continuation of FIG. 4B.

Next, a method for manufacturing the resin gear 1 will be described. In a case where the resin gear 1 is manufactured, an intermediate body 10 including the metal bush 3 and the resin member 7 illustrated in FIG. 4A is formed first by a known method. The metal bush 3 is formed by, for example, casting. The resin member 7 is formed by, for example, injection molding. The elastic member 5 is prepared in the space K1 as illustrated in FIG. 4B. One height-direction end portion of the elastic member 5 preferably has a tapered shape that tapers toward the tip. After an adhesive is applied in advance to the inner surface of the space K1, the elastic member 5 is inserted into the space K1 from one end portion side and the elastic member 5 is press-fitted into the space K1 via the first opening portion O1 formed by the first locking portion 9 as illustrated in FIG. 4C. Then, necessary processing is performed and the resin gear 1 is manufactured as a result. It should be noted that methods for manufacturing the resin gear 1 are not particularly limited and various methods can be used.

As described above, in a case where an impact is applied to the resin gear 1 according to the present embodiment as a result of meshing with another gear, the elastic member 5 is elastically deformed and acts as a detent and the impact is sufficiently absorbed and dampened. As a result, the damper effect of the elastic member 5 can be sufficiently obtained. It is possible to provide the resin gear 1 as a high-gear strength gear having a built-in rubber damper.

In the resin gear 1 according to the present embodiment, the space K1 has the inner surface 9A and the inner surface 11A intersecting with the axial direction. The elastic member 5 disposed in the space K1 engages with the inner surfaces 9A and 11A of the first locking portion 9 and the second locking portion 11. As a result, axial movement of the elastic member 5 is restricted. Accordingly, in the resin gear 1, axial disengagement of the elastic member 5 from the space K1 can be prevented. As a result, in the resin gear 1, the damper effect of the elastic member 5 can be sufficiently obtained.

The elastic member 5 is press-fitted into the space K1 in the resin gear 1 according to the present embodiment. As a result, the resin gear 1 can be assembled by the work of inserting the elastic member 5 with respect to the metal bush 3 and the resin member 7. Accordingly, the resin gear 1 can be manufactured more easily than in a case where the elastic member 5 is formed by injection molding or the like.

In addition, in a case where the elastic member 5 is formed by injection molding, an apparatus for injection molding is required, and thus an increase in manufacturing cost cannot be avoided. In contrast, the resin gear 1 can be manufactured by the work of press-fitting the elastic member 5 into the space K1, and thus the manufacturing cost can be reduced. Further, the resin gear 1 is manufactured by the metal bush 3, the elastic member 5, and the resin member 7 being individually manufactured and assembled. Accordingly, the process for manufacturing the resin gear 1 is not limited in rate, and thus a decrease in production rate can be avoided.

In the resin gear 1 according to the present embodiment, the metal bush 3 and the resin member 7 abut against each other so as to be slidable in the direction of rotation. As a result, it is possible to realize a configuration in which the metal bush 3 and the resin member 7 are disposed so as to be rotatable relative to each other.

In the resin gear 1 according to the present embodiment, the metal bush 3 and the resin member 7 are not bonded to each other. As a result, it is possible to realize a configuration in which the metal bush 3 and the resin member 7 are disposed so as to be rotatable relative to each other.

In the resin gear 1 according to the present embodiment, the elastic member 5 is bonded to the inner surface of the space K1. In this case, the elastic member 5 is unlikely to disengage from the space and the elastic member 5 can be elastically deformed to a large extent. As a result, it is also possible to cope with a case where a large impact is applied to the resin gear 1, and thus it is possible to realize the resin gear 1 that is capable of coping with a high load. It should be noted that the elastic member 5 does not have to be bonded to the inner surface of the space K1 and, in this case, the cost of the resin gear 1 can be reduced.

In the resin gear 1 according to the present embodiment, the space K1 and the elastic member 5 have a columnar shape. As a result, the space K1 and the elastic member 5 can be easily provided.

Although an embodiment of the present invention has been described above, the present invention is not necessarily limited to the embodiment described above and various modifications can be made within the gist of the present invention.

Although the first locking portion 9 and the second locking portion 11 have a circular ring shape in the embodiment described above, the present invention is not limited thereto. The first locking portion 9 and the second locking portion 11 may have any shape insofar as the first locking portion 9 and the second locking portion 11 have the inner surface 9A and the inner surface 11A. For example, the first locking portion 9 and the second locking portion 11 may be uneven in the circumferential direction thereof. In other words, the first locking portion 9 and the second locking portion 11 may have a shape in which projecting and recessed portions are alternately provided.

Although the elastic member 5 is provided in the space K1 between the metal bush 3 and the resin member 7 in the embodiment described above, the present invention is not limited thereto. A space K2 may be formed instead of the space K1 and an elastic member 5B may be provided instead of the elastic member 5 as in a resin gear 1B illustrated in FIG. 5.

Figure 5:
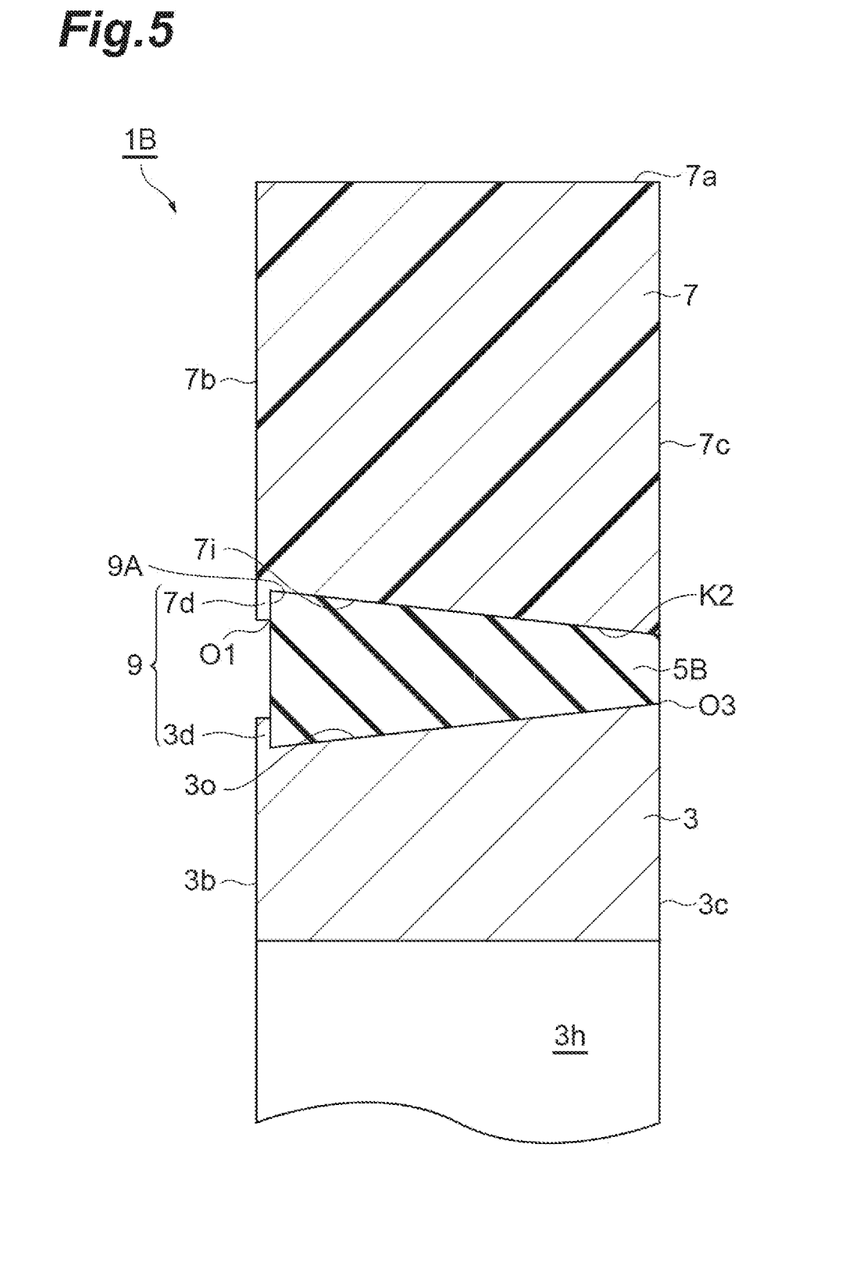
FIG. 5 is a cross-sectional view of a resin gear according to a first modification example.

The space K2 has a stepped truncated cone shape. The space K2 is defined by the U groove that is formed on the outer peripheral surface 3o, the U groove that is formed on the inner peripheral surface 7i of the resin member 7, and the first locking portion 9. The space K2 has the inner surface 9A in one end portion in the axial direction. The space K2 continuously decreases in diameter from one end portion to the other end portion in the axial direction. An opening portion O3 in the other axial end portion of the space K2 is smaller in inner diameter than one end portion side of the space K2.

The elastic member 5B has a truncated cone shape and is disposed in the space K2. The elastic member 5B abuts against the inner surface of the space K2. The elastic member 5B engages with the inner surface 9A orthogonal to the axial direction. In the resin gear 1B, the elastic member 5B engages with the inner surface 9A orthogonal to the axial direction as described above, and thus axial disengagement of the elastic member 5B from the space K2 can be prevented. In addition, in the resin gear 1, the opening portion O3 in the other axial end portion of the space K2 is smaller in inner diameter than one end portion side of the space K2, and thus axial disengagement of the elastic member 5B from the space K2 can be prevented.

In the embodiment described above, the numbers of the spaces K1 and the elastic members 5 aligned along the direction of rotation and the intervals thereof are not particularly limited. A plurality (two or more) of the spaces K1 and a plurality (two or more) of the elastic members 5 may be formed so as to be aligned along the direction of rotation. The numbers of the spaces K1 and the elastic members 5 aligned along the direction of rotation and the intervals thereof may be appropriately changed in accordance with specifications or the like.

Figure 6:
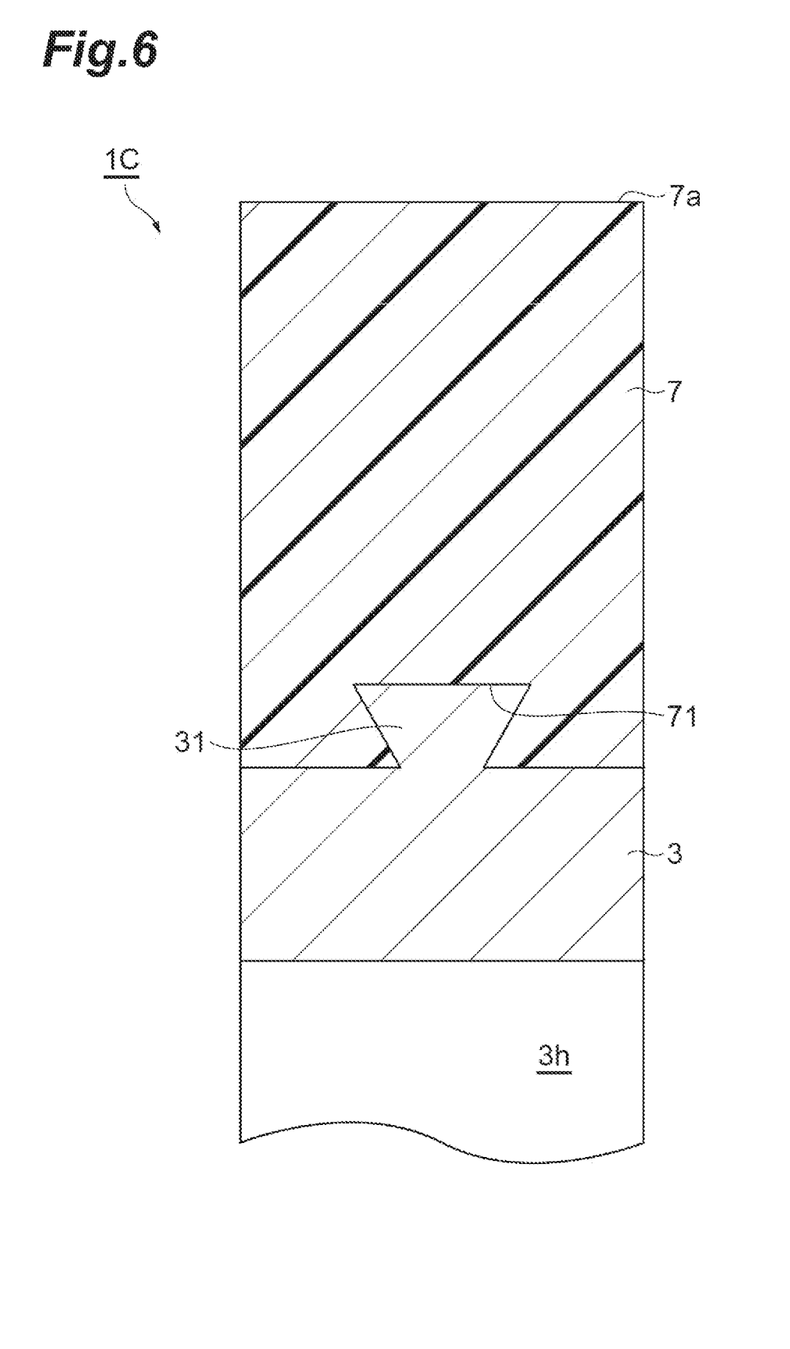
FIG. 6 is a cross-sectional view of a resin gear according to a second modification example.

Although the outer peripheral surface 3o of the metal bush 3 and the inner peripheral surface 7i of the resin member 7 extend straight in the axial direction in the embodiment described above, the present invention is not limited thereto. A projecting portion 31 may be formed on the outer peripheral surface 3o, a recessed portion 71 corresponding to the projecting portion 31 may be formed on the inner peripheral surface 7i, and the projecting portion 31 may be fitted in the recessed portion 71 so as to be slidable in the direction of rotation as in a resin gear 1C illustrated in FIG. 6. As a result, the metal bush 3 and the resin member 7 can be engaged with each other in the axial direction and disengagement of one from the other can be prevented. In addition, during sliding (relative rotation) of the metal bush 3 and the resin member 7 in the direction of rotation, the projecting portion 31 is capable of functioning as a rail guiding the sliding. It should be noted that FIG. 6, unlike FIG. 2, is a cross-sectional view at a cross-sectional position where the elastic member 5 is not illustrated.

The shapes of the space and the elastic member in one aspect of the present invention are not limited to the shapes of the spaces K1 and K2 and the elastic members 5 and 5B of the embodiment described above, and various shapes can be adopted. For example, the space and the elastic member may have a gourd shape, may have a dumbbell shape in which both end portions in the longitudinal direction are round, may have a rod shape extending in the radial direction, and may have a dumbbell shape in which both end portions in the longitudinal direction expand radially outward when viewed from the axial direction.

Although a form in which the resin gear 1 is a spur gear has been described as an example in the embodiment described above, the resin gear 1 may be a helical gear or the like. In the embodiment described above, an adhesive may be interposed between the metal bush 3 and the resin member 7 insofar as the metal bush 3 and the resin member 7 are capable of rotating relative to each other by a certain amount.

In the present invention, the configurations of the above-described embodiment and modification examples may be appropriately combined. The present invention can be variously modified within the gist thereof.

REFERENCE SIGNS LIST 1, 1B, 1C: resin gear, 3: metal bush, 3o: outer peripheral surface, 5, 5B: elastic member, 7: resin member, 7a: tooth profile, 7i: inner peripheral surface, 9A, 11A: inner surface, K1, K2: space.

The invention claimed is:

1. A resin gear comprising:
an annular metal bush; and
an annular resin member which is provided around the metal bush and comprises a tooth profile formed in an outer peripheral portion,
wherein the metal bush and the resin member are disposed so as to be relatively rotatable in a direction of rotation of the resin gear,
wherein a plurality of spaces entering an outer peripheral surface of the metal bush and an inner peripheral surface of the resin member are formed, so as to be aligned along the direction of rotation, between the metal bush and the resin member,
wherein each space among the plurality of spaces comprises a first end portion and a second end portion in an axial direction of the resin gear, and further comprises an inner surface intersecting the axial direction of the resin gear in at least one end portion among the first end portion and the second end portion, and
wherein an elastic member is bonded to the inner surface in each space of the plurality of spaces.

2. The resin gear according to claim 1,
wherein an inner diameter of an opening portion in the second end portion of the space in the axial direction is smaller than an inner diameter of an opening portion in the first end portion of the space in the axial direction.

3. The resin gear according to claim 1, wherein the elastic member is press-fitted into the space.

4. The resin gear according to claim 1, wherein the metal bush and the resin member abut against each other so as to be slidable in the direction of rotation.

5. The resin gear according to claim 1, wherein the metal bush and the resin member are not bonded to each other.

6. A resin gear manufacturing method to manufacture a resin gear comprising an annular metal bush, an annular resin member which is provided around the metal bush and comprises a tooth profile formed in an outer peripheral portion, and an elastic member provided between the metal bush and the resin member, the method comprising:
disposing the metal bush and the resin member so as to be relatively rotatable in a direction of rotation of the resin gear;
forming a plurality of spaces entering an outer peripheral surface of the metal bush and an inner peripheral surface of the resin member, so as to be aligned along the direction of rotation, between the metal bush and the resin member, wherein each space among the plurality of spaces comprises an inner surface intersecting an axial direction of the resin gear in at least one end portion of the space in the axial direction; and
press-fitting the elastic member into each space, wherein the elastic member and the inner surface are bonded with each other.

7. The resin gear according to claim 1, wherein the space comprises inner surfaces intersecting the axial direction in both the first end portion and the second end portion in the axial direction.

8. The resin gear according to claim 1,
wherein an inside half of the space in a radial direction of the resin gear enters towards the metal bush, and
wherein an outside half of the space in the radial direction of the resin gear enters towards the resin member.

9. The resin gear according to claim 1,
wherein the space comprises:
a lower U groove which is formed on the outer peripheral surface of the metal bush;
an upper U groove which is formed on the inner peripheral surface of the resin member;
a first locking portion; and
a second locking portion,
wherein the first locking portion is provided in the first end portion in the axial direction and comprises a first inner surface, and
wherein the second locking portion is provided in the second end portion in the axial direction and comprises a second inner surface.

10. The resin gear according to claim 9,
wherein the first locking portion comprises a first opening portion opening to a first end surface of the metal bush and a first end surface of the resin member,
wherein the second locking portion comprises a second opening portion opening to a second end surface of the metal bush and a second end surface of the resin member, and
wherein an inner diameter of the first opening portion and an inner diameter of the second opening portion are smaller than an inner diameter of the space.

11. The resin gear according to claim 1, wherein the plurality of the spaces are arranged at a substantially equal interval along the direction of rotation of the resin gear when viewed from the axial direction.

12. The resin gear according to claim 1,
wherein an outer diameter of the metal bush and an inner diameter of the resin member are substantially equal,
wherein the outer peripheral surface of the metal bush and the inner peripheral surface of the resin member are not bonded to each other, and
wherein the outer peripheral surface of the metal bush and the inner peripheral surface of the resin member rotatably contact each other.

* * * * *